(12) United States Patent
Vishik et al.

(10) Patent No.: US 7,877,790 B2
(45) Date of Patent: Jan. 25, 2011

(54) SYSTEM AND METHOD OF USING PERSONAL DATA

(75) Inventors: Claire Svetlana Vishik, Austin, TX (US); Lalitha Suryanarayana, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1238 days.

(21) Appl. No.: 11/263,650

(22) Filed: Oct. 31, 2005

(65) Prior Publication Data

US 2007/0101413 A1    May 3, 2007

(51) Int. Cl.
| H04L 9/32 | (2006.01) |
| G06K 9/00 | (2006.01) |
| G06F 12/14 | (2006.01) |
| H04N 7/16 | (2006.01) |
| H04L 9/00 | (2006.01) |
| H04K 1/00 | (2006.01) |
| G06F 17/30 | (2006.01) |
| G06F 15/16 | (2006.01) |
| G06F 12/00 | (2006.01) |
| G06F 7/04 | (2006.01) |
| G06F 13/00 | (2006.01) |
| G06F 7/58 | (2006.01) |
| H03M 1/68 | (2006.01) |
| G06K 19/00 | (2006.01) |

(52) U.S. Cl. ............................ 726/5; 713/183; 713/186; 726/18; 726/29; 726/6; 726/7

(58) Field of Classification Search .................... 726/5, 726/6, 7, 18; 713/183, 186
See application file for complete search history.

(56) References Cited

U.S. PATENT DOCUMENTS

| 7,188,252 | B1 * | 3/2007 | Dunn ......................... 713/182 |
| 7,194,554 | B1 * | 3/2007 | Short et al. ................. 709/246 |
| 2002/0069368 | A1 * | 6/2002 | Hines ......................... 713/201 |
| 2003/0079144 | A1 * | 4/2003 | Kakemizu et al. ........... 713/200 |
| 2005/0044423 | A1 * | 2/2005 | Mellmer et al. ............. 713/201 |
| 2005/0071673 | A1 * | 3/2005 | Saito ......................... 713/201 |
| 2005/0097049 | A1 * | 5/2005 | Writer et al. ................. 705/44 |
| 2006/0106936 | A1 * | 5/2006 | De Luca et al. ............. 709/228 |
| 2006/0288090 | A1 * | 12/2006 | Kraft ......................... 709/219 |
| 2007/0118629 | A1 * | 5/2007 | Kerdraon et al. ............ 709/223 |

* cited by examiner

*Primary Examiner*—Kambiz Zand
*Assistant Examiner*—Aubrey H Wyszynski
(74) *Attorney, Agent, or Firm*—Toler Law Group, I.P.

(57) ABSTRACT

The present disclosure is directed to a system and method to manage data flow in a network. The method can include storing a plurality of profiles of a user, wherein each profile includes user data. The method can also include receiving a request for a portion of user data. The method also includes selecting a type of credential, at least partially based on: an origin of the request, the user data requested, a transaction value, a plurality of data disbursement rules, or any combination thereof.

39 Claims, 5 Drawing Sheets

SYSTEM AND METHOD OF USING PERSONAL DATA

FIELD OF THE DISCLOSURE

The present disclosure relates generally to using personal data.

BACKGROUND OF THE DISCLOSURE

Electronic communication increases the efficiency of financial transactions. Credit card machines and e-commerce websites facilitate rapid transmission of personal and financial data, eliminating the need for cash or even personal interaction. Customers can place orders and purchase goods and services by allowing merchants to remotely access their financial accounts. Customers can use many funding sources to complete transactions, including a variety of credit cards, debit cards, and electronic bank transfers. Funds can be approved for transfer, and the transactions can be completed in mere seconds.

The security of electronic transactions has become a primary concern for customers and merchants. As a customer conducts more electronic transactions, the customer's personal and financial information may be more likely to be stolen. In order to protect sensitive information, both merchants and financial institutions may encrypt financial data and require customers to enter unique authentication information in order to conduct transactions. For increased security, customers would preferably use different authentication information for separate accounts, but as personal and financial data becomes more distributed, the difficulty of recalling the authentication or personalization information increases.

DETAILED DESCRIPTION OF THE DRAWINGS

A system to use personal data is disclosed and includes a processor and a memory accessible to the processor. A computer program is embedded in the memory and can include instructions to store a plurality of profiles of a user, wherein each profile includes user data. The computer program can also include instructions to receive a request for a portion of user data. The computer program can also include instructions to select a type of credential, at least partially based on: an origin of the request, the user data requested, a transaction value, a plurality of data disbursement rules, or any combination thereof. In a particular embodiment, the plurality of profiles of the user can be linked by a common identifier of the user.

A system to use personal data is disclosed and includes a processor and a memory accessible to the processor. A computer program is embedded in the memory and can include instructions to store a plurality of profiles of a user, wherein each profile includes user data. The computer program can also include instructions to receive a request to provide a portion of user data. The computer program can also include instructions to select a type of authentication, at least partially based on an origin of the and a plurality of data management rules.

In another embodiment, a method of using personal data is disclosed. The method can include storing a plurality of profiles of a user, wherein each profile includes user data. The method can also include receiving a request for a portion of user data. The method also includes selecting a type of credential, at least partially based on: an origin of the request, the user data requested, a transaction value, a plurality of data disbursement rules, or any combination thereof.

In another embodiment, a method of receiving personal data is disclosed. The method can include storing a plurality of profiles of a user, wherein each profile includes user data. The method can also include receiving a request to provide a portion of user data. The method can also include detecting a source of the request and selecting a type of authentication at least partially based on an origin of the request and a plurality of data management rules.

Figure 1:
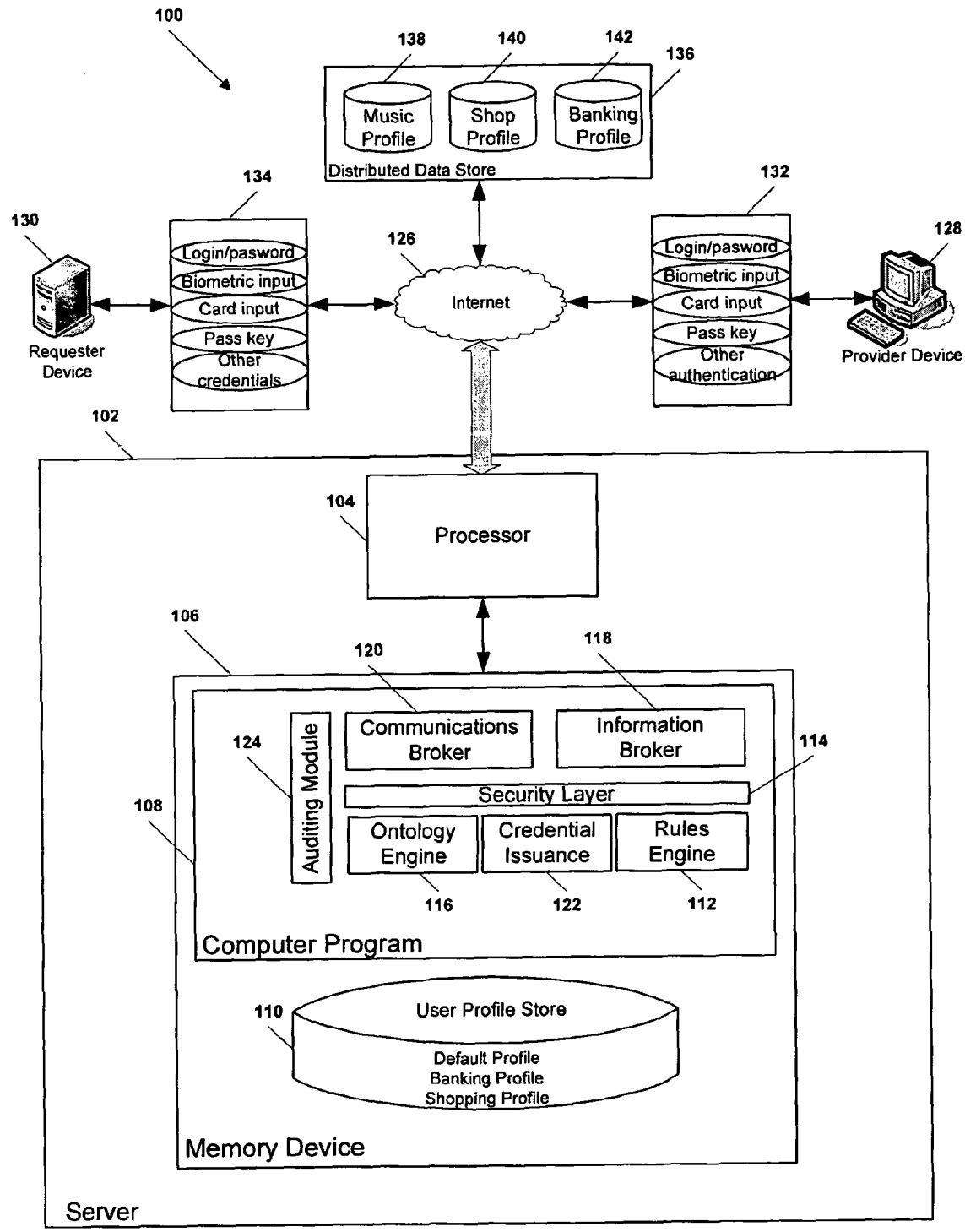
FIG. 1 is a block diagram illustrating an embodiment of a system to use personal data.

Referring to FIG. 1, an exemplary system to use personal data is illustrated and is generally designated 100. As illustrated, the system 100 includes a server 102. The server includes a processor 104 and a memory device 106 that is accessible to the processor 104. Further, the memory device 106 can include a user profile store 110 that includes user data. In a particular embodiment, the user profile store 110 can include the user data as a plurality of profiles, each of which contains a combination of personal data associated with a user. Additionally, the server 102 includes a computer program 108 embedded within the memory device 106. In a particular embodiment, the computer program 108 can include various modules or layers 112-124 that contain instructions to provide functions, such as security, data disbursement, auditing, and other functions provided by the server 102.

As illustrated in FIG. 1, the server 102 can communicate with various communication devices via the Internet 126. For example, the server 102 communicates with a provider device 128, such as a personal computer (PC) from which a user inputs and manages personal data stored by the user profile store 110. The server 102 can also communicate with a requester device 130, such as a web server from which a merchant or employer transmits requests for personal data associated with a user. In a particular embodiment, the server 102 can communicate with additional provider devices similar to provider device 128 and additional requester devices similar to requester device 130 via authentication devices similar to authentication device 132 or credential devices similar to credential device 134. An authentication device 132 may be a device at which an authentication request is originated or received. In one embodiment, the authentication device 132 and the credential device 134 can enable a requester or provider to transmit authentications (provider side) or credentials (requester side) in addition to a user identification (UID) identification or password. The authentication device 132 and credential device 134 can be separate from, coupled to, or integrated with, the provider device 128 and the requester device 130. For example, an authentication device 132 can be a smart card reader that is coupled to a provider device 128, such as a user's PC. The user can issue requests to provide data via the PC and can transmit authentication data via the smart card reader coupled thereto.

Examples of the authentication device 132 and the credential device 134 can include a personal computer (PC), a laptop computer, a handheld computing device, a biometric input device, an electronic fingerprint scanner, a retinal scanner, a voice print device, an Internet Protocol (IP) phone, a credit card machine, a smart card reader device, an electronic key pad, or any other electronic device suitable for transmitting one or more types of authentications and credentials to the server 102 via the Internet 126.

In a particular embodiment, the server 102 can communicate with a distributed data store 136 via the Internet 126. The distributed data store 136 can store user data, user profiles, or any combination thereof, in one or more databases 138, 140, 142. In an illustrative embodiment, the server 102 can retrieve user profiles, user data, or any combination thereof, by transmitting queries via the Internet 126 to one or more of the databases 138, 140, 142 within the distributed data store 136. The distributed data store 136 can store user profiles redundantly with the user profile store 110 at the server 102. Alternatively, the distributed data store 136 can store user profiles, user data, or any combination thereof, instead of the user profile store 110 at the server 102. In one embodiment, the distributed data store 136 can store user profiles user data, or any combination thereof, that are not stored with the profiles stored at the user profile store 110, such as profiles that are more or less secure than the profiles stored at the user profile store 110. In another embodiment, profiles stored at the user profile store 110 can include pointers to personal data items that are stored at the distributed data store 136.

In an illustrative embodiment, the user profile store 110 and the database(s) within the distributed data store 136 can be, for example, relational databases, hierarchical databases, a directory model, Lightweight Directory Access Protocol (LDAP) databases, or any other suitable types of databases.

Examples of user data stored at the user profile store 110 or the distributed data store 136 can include personal and financial data associated with a specific user, such as a user name, a user address, at least one user phone number, at least one user e-mail address, at least one user credit card number, at least one user credit card expiration date, at least one user bank account number, at least one user bank routing number, a user social security number, a user drivers license number, a user identification number, a user's place of birth, a user's data of birth, a user's mother's maiden name, and any other personal identification information. User data can also include preference data, such as at least one shopping profile, at least one music profile, at least one banking profile, and other data that indicates the user's preferences for transactions, vendors, products, or services of various kinds.

In a particular embodiment, the computer program 108 at the server 102 can include instructions to communicate with the provider device 128, from which the server receives a request to provide data to the user profile store 110 or the distributed data store 136. Further, the computer program 108 also includes instructions to detect the source of the request, such as the provider device 128. The provider device can be detected and identified by querying the user profile store 110 or the distributed data store 136 for a device associated with an IP address in the user's account.

Additionally, the computer program 108 can include instructions that constitute one or more data management rules within a rules engine 112. Data management rules can be specified by the user and can include instructions to determine at least one authentication type or method that will be used to authenticate a provider device 128 before allowing access to, and editing of, a user's data. In a particular embodiment, the data management rules determine the authentication(s) to be used, based at least partially on the identity of the provider device 128. For example, the data management rules can include instructions to use a less secure authentication type or method, such as a user identification (UID) and password, when the request to access user data is issued from the user's home PC. Conversely, the data management rules can include instructions to use a more secure authentication, such as a smart card input, when the request is issued by a less secure device, such as a web-enabled cellular phone or a portable laptop using a wireless Internet connection. The data management rules can also include instructions to use a highly secure authentication, such as a fingerprint scan, from a device that is not associated with the user, such as a newly purchased device or a public computer in a library, hotel or other public location. In one embodiment, the data management rules can include instructions to use a multi-factor authentication, such as a fingerprint scan, in addition to a UID and password.

In a particular embodiment, the data management rules within the rules engine 112 can include instructions to determine what user data and profiles a user can access, based on the identity of the provider device 128. For instance, the data management rules can include instructions to allow access to less sensitive data or profiles, such as a shopping profile, when the user's data is accessed from a less secure device, such as a public computer, regardless of the level of authentication. Similarly, the data management rules can include instructions to allow access to sensitive data, such as bank account numbers, from the user's home PC.

Additionally, the data management rules can combine levels of authentication with the identity of provider devices 128 to determine what data can be accessed from a provider device 128 and what data can be displayed in response to such access. For example, the data management rules can include instructions to allow access to less sensitive data or profiles when data is accessed from a public device and a password is used as an authentication; whereas, the data management rules can include instructions to allow access to more sensitive data when the data is accessed from a public device, but a retinal scan is used as an authentication. In another example, the data management rules can include instructions to allow review of user data when a password is received from the user's home PC, and the data management rules can include instructions to allow editing of user data when a fingerprint is received from the user's home PC or a device coupled thereto.

Additionally, the computer program 108 can include instructions that constitute one or more data disbursement rules within the rules engine 112. Data disbursement rules can be specified by the user and can include instructions to determine at least one credential type that will be used to verify a requester device 130 before the requester may receive a user profile. In a particular embodiment, the data disbursement rules determine the credential(s) to be used, based at least partially on the identity of the requester device 130, the user profile requested, the value of any transaction involved, or any combination thereof. For example, the data disbursement rules can include instructions to use a less secure credential, such as a UID and password, when a request to access a user's credit card number is issued from a web server identified in the user's account, in conjunction with an online purchase of twenty dollars ($20.00) over a secure socket layer (SSL). Conversely, the data disbursement rules can include instructions to use a more secure credential, such as a smart card input, when a request to access a user's bank account number is issued from a keypad or cash register at an unidentified retail location in conjunction with a purchase of five hundred dollars ($500.00).

In a particular embodiment, the data disbursement rules within the rules engine 112 can include instructions to determine what user profile(s) or data can be submitted to a requester, based on the identity of the requester device 130. For instance, the data disbursement rules can include instructions to allow access to a default profile when a request for user data is issued from an isolated retail outlet, regardless of the level of credential. Similarly, the data disbursement rules can include instructions to allow access to sensitive data, such as bank account numbers, from a requester device 130 at the user's bank or at a store from which the user makes frequent purchases. In an illustrative embodiment, the data disbursement rules can include instructions to pre-fill forms needed to make a purchase when the user data is accessed from a home computer of the user and the forms or data is directed to a known merchant. Whereas, no fields may be pre-filled in such forms when the user data is accessed from a public computer with a request directed to a new merchant.

Additionally, the data disbursement rules can combine levels of credentials with the identity of requester devices 130 to determine what data can be accessed from a requester device 130. For example, the data disbursement rules can include instructions to allow access to less sensitive data or profiles when data is requested from an isolated retail outlet and a key code is used as an credential; whereas, the data disbursement rules can include instructions to allow access to more sensitive data when the data is accessed from an isolated retail outlet, but a biometric input is used as an credential.

In another embodiment, the rules engine 112 can include instructions to determine what rules within the rules engine 112, ontology engine 116, and credential issuance module 122 can be accessed from a provider device 128, based on the identity of the provider device 128 and the authentication received. For example, the data management rules can include instructions to allow editing of various rules within the computer program 108 from a user's home PC, regardless of any authentication received from another device. Alternatively, the data management rules can include instructions to allow editing of various rules within the computer program 108 from devices that transmit a fingerprint as an authentication.

In addition to the rules engine 112, the computer program 108 can also include a security layer 114. In a particular embodiment, the security layer 114 can include instructions to transmit prompts for authentications to provider devices 128 or for credentials to requester devices 130. The security layer receives authentications or credentials for which the security layer 114 transmits prompts, from the user profile store 110 or distributed data store 136 according to data management rules or data disbursement rules. Further, the security layer 114 can include instructions to receive inputs and compare them with the authentications or credentials. Moreover, the security layer 114 can include instructions to allow access to user data specified by the rules engine 112, when inputs match the authentications or credentials that are used and to deny all access to user data when inputs do not match the authentications or credentials that are used.

The computer program 108 can include instructions to communicate with the provider device 128, in order to receive new data and edited data when access is granted by the security layer 114. Additionally, the computer program 108 can include instructions to include the data and edited data in the user profile store 110, the distributed data store 136, or any combination thereof. In a particular embodiment, the computer program 108 can include an ontology engine 116 that includes instructions to organize data received from the user into a plurality of profiles. For example, the ontology engine 116 can include instructions to organize a user's name, address, phone number, and e-mail address into a default profile. Further, the ontology engine 116 can include instructions to organize a user's name, address, phone number, bank routing number, and checking account number into a banking profile. Moreover, the ontology engine can include instructions to organize data relating to the user's purchasing preferences into a shopping profile. In an illustrative embodiment, the ontology engine 116 can include instructions to organize data into profiles, according to a plurality of ontology rules specified by the user.

In an illustrative embodiment, the ontology engine 116 can include instructions to arrange profiles into a hierarchy, based on ontology rules specified by the user. For example, a user can specify an ontology rule stating that any profile containing the user's bank routing number or social security number should be placed lowest or highest within the hierarchy, to reflect the sensitivity of the information. The user can then establish data management and disbursement rules in terms of the hierarchy, such as instructions to limit access by provider devices 128 operating via a wireless Internet connection to profiles within a third hierarchy level, such as shopping profiles. Further, the rules engine 112 can include instructions to allow access to a second hierarchy level, such as a banking profile, by a user's home PC.

In one embodiment, the computer program 108 can include instructions communicate with a requester device 130, in order to receive a request for user data. The computer program 108 also contains instructions to detect the source of the request, such as the requester device 130. In a particular embodiment, the computer program 108 can contain instructions to prompt the requester for a transaction value. The rules engine 112 determines what data may be accessed from the requester device 130 and what credentials will be used to access each type or hierarchical level of accessible data, based at least partially on the requester device 130, the requested data, the transaction value, or any combination thereof. The security layer 114 can prompt the requester for a credential and determine whether it is received. The computer program 108 can contain instructions to retrieve and transmit the requested data as one or more profiles, if the credential is received.

In a particular embodiment, the computer program 108 can include an information broker 118 that includes instructions to retrieve profiles containing requested data, to which the requester device 130 has been granted access, from the user profile store 110 or the distributed data store. Additionally, the information broker can include instructions to transmit the data to a communications broker module 120 for transmission to the requester device 130.

The communications broker 120 includes instructions to transmit profiles retrieved by the information broker 118 to the requester device 130. In a particular embodiment, the communications broker 120 can also include instructions to transmit a validation to the requester device 130, which states that the input received at the security layer 114 matched the credential. Moreover, the communications broker 120 can include instructions to translate the profile and any other information that it transmits to the requester device 130, as necessary, from a security protocol used by the communication broker 120 and other elements of the computer program 108 into a security protocol that is used at the requester device 130.

In a particular embodiment, the computer program 108 can also include a credential issuance module 122. The credential issuance module 122 can include instructions to provide and track temporary credentials when the rules engine 112 denies access of a requester device 130 to all user data or specified user data. In one embodiment, a temporary credential can include a credential that expires after a set period without further action by a user. For example, if a requester device 130 at a restaurant is denied access to a user's credit card information by the data disbursement rules within the rules engine 112, the credential issuance module 122 can determine whether a temporary credential can be issued to the user, according to rules established by the user. If the credential issuance module 122 determines that a temporary credential should be issued, the credential issuance module 122 can transmit the temporary credential to the user via a telephone, cellular phone, or other device designated by the user in the rules within the credential issuance module 122. The security layer 114 can include instructions to prompt the requesting device 130 for the temporary credential and to allow access to user data when the temporary credential is received. In an illustrative embodiment, the credential issuance module 122 can include instructions to set an expiration period for the temporary credential, such that the security layer 114 will not grant access to user data by any requesting device 130 that submits the temporary credential, after a specified period, e.g., one hour or thirty days, or after a specified number of transactions.

In a particular embodiment, the computer program 108 can also include an auditing module 124 that monitors and tracks transactions. For instance, the auditing module 124 can include a plurality of logs that record transactions between a user and various requesters. The auditing module can include instructions to analyze the logs and manipulate or suggest user profiles, security rules, credentials, and levels of access granted to various requester devices 130. For instance, if a user conducts a transaction with a new retail outlet and continues to conduct regular transactions with the retail outlet over time, the auditing module could contain instructions to reduce the credentials needed by the requester device 130 at the retail outlet in order to access user data. Alternatively, the auditing module 124 could contain instructions to suggest making such changes to the user, the next time that the user accesses his or her data for editing. Additionally, the auditing module 124 can contain instructions to manipulate or suggest changes to user profiles, such as shopping or music profiles, based at least partially on information in its logs.

In a particular embodiment, the elements of the system described above can be used to implement one or more methods, examples of which are described below. The methods can be executed in the order illustrated by the figures. In alternative embodiments, the actions may be executed in part, in alternative sequences, or in other manners that differ from the methods illustrated.

Figure 2:
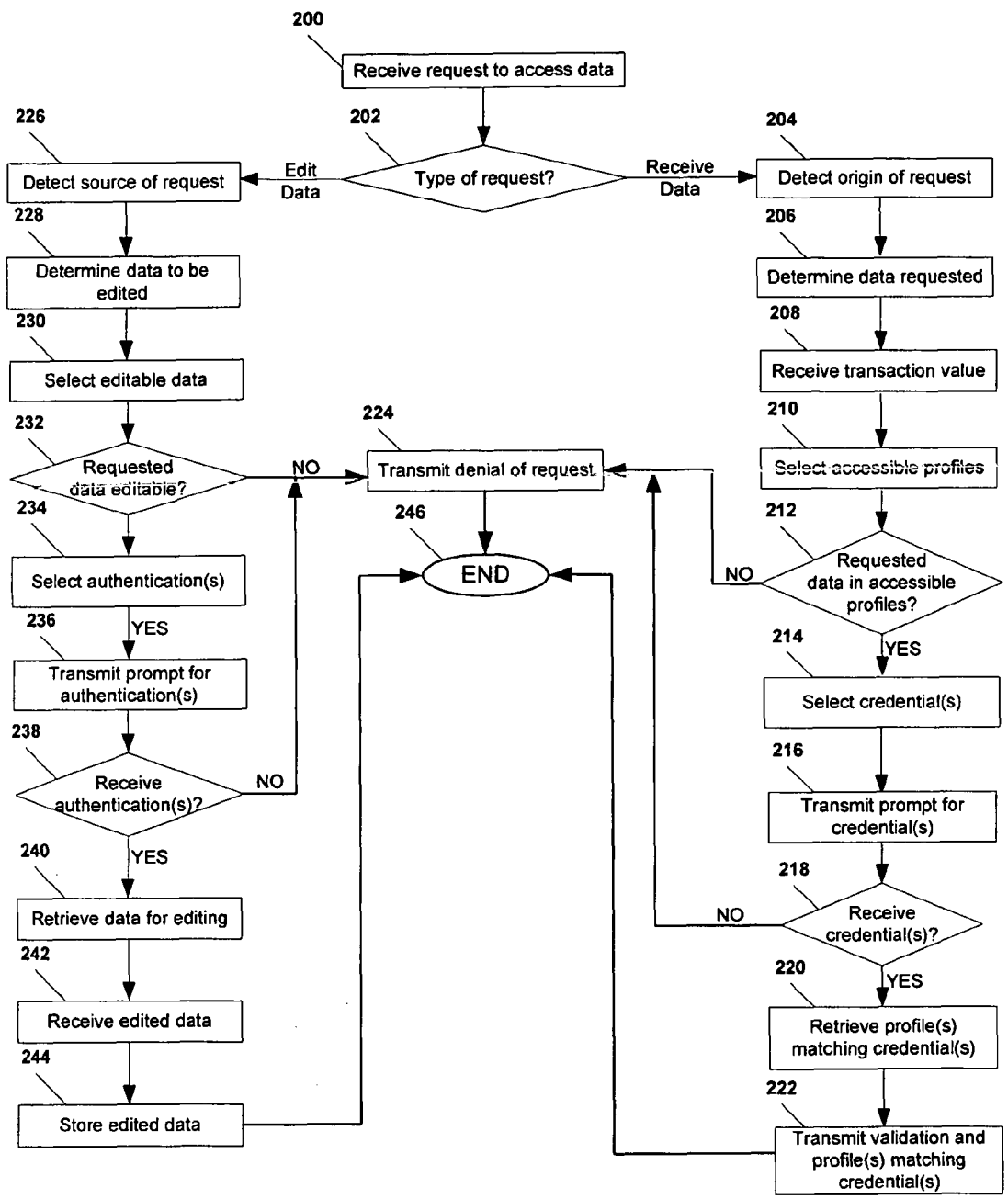
FIG. 2 is a block diagram illustrating an embodiment of a method to use personal data.

Referring to FIG. 2, a method of using personal data is illustrated. At block 200, a server including a personal data repository receives a request from a communication device to access personal data associated with a user. Moving to decision step 202, the server determines the type of the request received from the communication device. In a particular embodiment, if the request is a request to receive data, for example, at a merchant, employer, or other data requester, the method proceeds to block 204, and the origin of the request is detected. The requester device can be detected and identified, for example, by identifying an IP address of the requester device or by querying a user profile store or distributed data store for a device associated with the account of the user about whom data is requested.

Continuing to block 206, the server determines the type of data requested by the requesting device. In a particular embodiment, the type of data requested can be transmitted with the request for the user data. Alternatively, the server can determine which data has been requested by communicating a prompt to the requesting device for the specific data or type of data requested. In a particular embodiment, the server can determine a hierarchical level associated with the requested data within a user profile store or distributed data store.

At block 208, the server can receive a transaction value from the requesting device. In one embodiment, the transaction value can be transmitted with the request to access user data. In an alternate embodiment, the server can transmit a prompt to the requesting device for the transaction value.

After the transaction value is determined at block 208, the method continues to block 210, and the server selects one or more profiles that the requesting device can access. The server can select the profile(s) via a rules engine containing a plurality of user-specified data disbursement rules that determine which profiles of the user are accessible to a requesting device, based at least partially on the identity of the requesting device, the user data requested, the transaction value, and any combination thereof.

Proceeding to decision step 212, the server determines whether the data requested is available in the profiles that are accessible to the requesting device. For example, the requesting device may transmit a request for a user's bank account number, but the data disbursement rules in the rules engine may determine that the requesting device does not qualify to gain access to the user's bank account number. If the data requested by the requesting device is not within the user profiles that the requesting device may access according to the data disbursement rules, the method proceeds to block 224, and a denial of the request for user data is transmitted to the requesting device. The denial can be generated and transmitted to the requesting device by a security layer or communications broker within a computer program embedded in the server's memory device.

Returning to decision step 212, if the server determines that the user data requested by the requesting device is within one or more of the profiles to which the requesting device can gain access, the method proceeds to block 214, and the server selects one or more credentials that are used to verify the requesting device before it may access a profile containing the requested user data. In a particular embodiment, the credential(s) can be selected according to data disbursement rules in a rules engine of a computer program embedded within the server. In an illustrative embodiment, when the requested data is available in more than one profile, the server can select a credential associated with a less sensitive profile containing the requested user data. For example, if the requested data is the user's address, the server can select a credential for the user's default profile, rather than the user's banking profile.

Continuing to block 216, the server can prompt the requesting device for the credential(s) selected at block 214. The server can issue the prompt, for example, from a security layer or a communications broker within a computer program embedded within the server's memory. Moving to decision step 218, the server can determine whether the credential(s) have been received from the requesting device. If the credential(s) are not received, the method moves to block 224, and the server can transmit a denial of the request for user data to the requesting device.

When the credential(s) are received at decision step 218, the method proceeds to block 220, and the server retrieves one or more profiles that the requesting device may access after submitting the credential(s) determined at block 216. In one embodiment, the profile(s) can be retrieved from a user profile store or distributed data store using an information broker module in a computer program embedded within the server memory. In a particular embodiment, at block 222, the server can transmit the retrieved profile(s) and a validation of the credential submitted by the requesting device. After the retrieved profile(s) are transmitted, the method can end at state 246.

Returning to decision step 202, if the server determines that the request to access user data is a request to edit the user data or any associated rules, the method moves to block 226, and the source of the request is detected. The provider device can be detected and identified, for example, by identifying an IP address of the provider device or by querying a user profile store or distributed data store for a device associated with the account of the user.

Continuing to block 228, the server determines the type of data that is to be edited. In a particular embodiment, the type of data to be edited can be transmitted with the request from the provider device. Alternatively, the server can determine which data is to be edited by communicating a prompt to the provider device for the specific data or type of data that is to be edited. In a particular embodiment, the server can determine a hierarchical level associated with the data to be edited within a user profile store or distributed data store.

After the data to be edited is determined at block 228, the method continues to block 230, and the server selects data that the provider device can access and edit. The server can select the data via a rules engine containing a plurality of user-specified data management rules that determine which user data is accessible to a provider device, based at least partially on the identity of the provider device.

Proceeding to decision step 232, the server determines whether the data to be edited is available to the provider device. For example, the provider device may transmit a request to edit the user's drivers license number, but the data management rules in the rules engine may determine that the provider device does not qualify to gain access to the user's drivers license number. In another example, the provider device may transmit a request to edit one or more data disbursement rules, but the data management rules may deny the provider device access to the data disbursement rules. If the data to be edited by the provider device is not accessible to the provider device according to the data management rules, the method proceeds to block 224, and a denial of the request to edit user data is transmitted to the provider device. The denial can be generated and transmitted to the provider device by a security layer or communications broker within a computer program embedded in the server's memory device.

Returning to decision step 232, if the server determines that the user data to be edited by the provider device is accessible to the provider device according to the data management rules, the method proceeds to block 234, and the server selects one or more types of authentication that will be used to authenticate the provider device, before allowing access the user data that is to be edited. In a particular embodiment, the authentication(s) to be used can be selected according to data management rules in a rules engine of a computer program embedded within the server.

Continuing to block 236, the server can prompt the provider device for the authentication(s) selected at block 234. The server can issue the prompt, for example, from a security layer in a computer program embedded within the server's memory. Moving to decision step 238, the server can determine whether the authentication(s) have been received from the provider device. If authentication(s) are not received, the method moves to block 224, and the server can transmit a denial of the request for user data to the provider device.

When the authentication(s) are received at decision step 238, the method proceeds to block 240, and the server retrieves data that the provider device may access after submitting the authentication(s). In one embodiment, the data can be retrieved from a user profile store or distributed data store. Continuing to block 242, the server can receive edits to the data. The edited data can be stored at block 244. After the edited data has been stored, the method ends at state 246.

Figure 3:
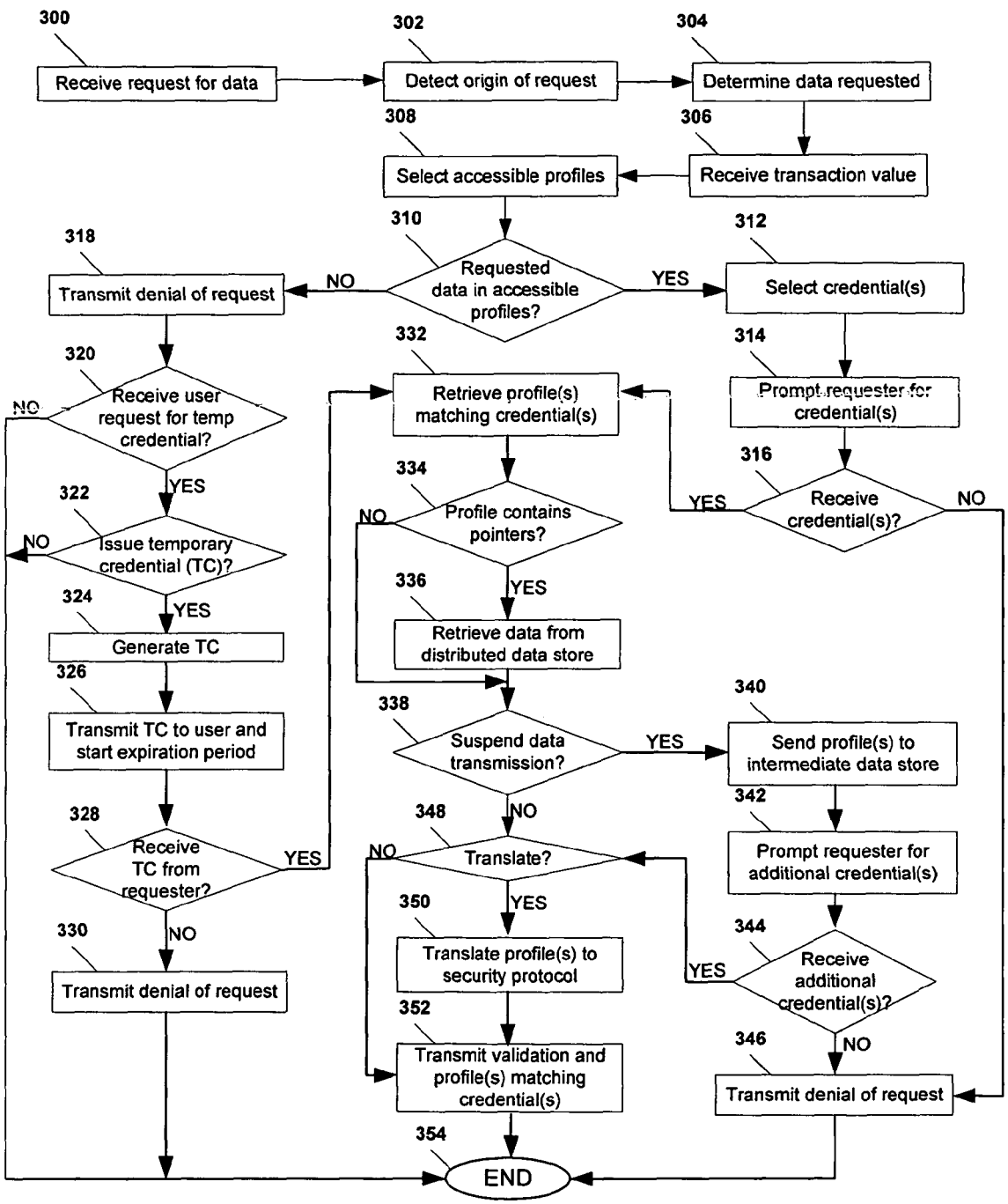
FIG. 3 is a flow diagram illustrating a second embodiment of a method to use personal data.

Referring to FIG. 3, a second method of using personal data is illustrated. At block 300, a server including a personal data repository receives a request from a communication device to access personal data associated with a user. Moving to block 302, the origin of the request is detected. The requester device can be detected and identified, for example, by identifying an IP address of the requester device or by querying a user profile store or distributed data store for a device associated with the account of the user about whom data is requested.

Continuing to block 304, the server determines the type(s) of data requested by the requesting device. In a particular embodiment, the type of data requested can be transmitted with the request for the user data. Alternatively, the server can determine which data has been requested by communicating a prompt to the requesting device for the specific data or type of data requested. In a particular embodiment, the server can determine a hierarchical level associated with the requested data within a user profile store or distributed data store.

At block 306, the server can receive a transaction value from the requesting device. In one embodiment, the transaction value can be transmitted with the request to access user data. In an alternate embodiment, the server can transmit a prompt to the requesting device for the transaction value.

After the transaction value is determined at block 306, the method continues to block 308, and the server selects one or more profiles that the requesting device can access. The server can select the profile(s) via a rules engine containing a plurality of user-specified data disbursement rules that determine which profiles of the user are accessible to a requesting device, based at least partially on the identity of the requesting device, the user data requested, the transaction value, or any combination thereof.

Proceeding to decision step 310, the server determines whether the data requested is available in the profiles that are accessible to the requesting device. For example, the requesting device may transmit a request for a user's bank account number, but the data disbursement rules in the rules engine may determine that the requesting device does not qualify to gain access to the user's bank account number.

If the server determines that the user data requested by the requesting device is within one or more of the profiles to which the requesting device can gain access, the method proceeds to block 312. At block 312, the server selects one or more credentials that are used to verify the requesting device before the requesting device can access a profile containing the requested user data. In a particular embodiment, the credential(s) used can be selected according to data disbursement rules in a rules engine of a computer program embedded within the server. In an illustrative embodiment, when the requested data is available in more than one profile, the server can select a credential associated with a less sensitive profile containing the requested user data. For example, if the requested data is the user's address, the server can select a credential associated with the user's default profile, rather than the user's banking profile.

Continuing to block 314, the server can prompt the requesting device for the credential(s) selected at block 312. The server can issue the prompt, for example, from a security layer or a communications broker within a computer program embedded within the server's memory. Moving to decision step 316, the server can determine whether the credential(s) have been received from the requesting device. If the credential(s) are not received, the method moves to block 346, and the server can transmit a denial of the request for user data to the requesting device. The denial can be generated and transmitted to the requesting device by a security layer or communications broker within a computer program embedded in the server's memory device.

When the credential(s) are received at decision step 316, the method proceeds to block 332, and the server retrieves one or more profiles that the requesting device may access after submitting the credential(s) selected at block 312. In one embodiment, the profile(s) can be retrieved from a user profile store, distributed data store, or any combination thereof, using an information broker module in a computer program embedded within the server memory.

In a particular embodiment, the method proceeds to block 334, and the server determines whether the profile(s) that are retrieved contain any data pointers. If the profile(s) do not contain data pointers, the method moves to decision step 338. If the profile(s) contain data pointers, the method continues to block 336, and data that is referenced by the pointers is retrieved, for example, by the information broker from the distributed data store. The method then moves to decision step 338.

At decision step 338, the server determines whether to suspend transmission of the user profile(s) to the requester device. The server may determine to suspend transmission according to data disbursement rules within the rules engine. Transmission can be suspended due to, for example, a re-established connection with the requester device, a change in the Internet connection of the requester device from hard-wired to wireless, or any other change in the requester device that may compromise security of the user data requested. In an alternative embodiment, the server may determine to suspend retrieving the user data at block 332, according to the data disbursement rules.

In a particular embodiment, if the transmission of user data is suspended, the method moves to block 340, and the server transmits the profile(s) to an intermediate data store. Further, the method continues to block 342, and the server prompts the requester device for an additional credential(s), based on the data disbursement rules. Proceeding to block 344, the server can determine whether it has received the additional credential(s). If the server does not receive the additional credential(s), the method moves to block 346, and the server transmits a denial of the request for user data to the requester device. If the server receives the additional credential(s), the method moves to decision step 348 and the method continues as described.

Returning to decision step 338, if the server does not suspend transmission of user data to the requester device, the method proceeds to decision step 348, and the server determines whether to translate the user profile(s) to a security protocol other than the protocol used at the server. If the server determines not to translate the user profile(s), the method continues to block 352. On the other hand, if the server determines to translate the user profile(s), the method moves to block 350, and the server translates the user profile(s) to the security protocol of the requester device, e.g., via a communications broker module in the server's computer program. The method then continues to block 352, and the server transmits the user profile(s) to the requester device with a validation of the credential(s) submitted by the requester device to the server.

Returning to decision step 310, if the data requested by the requester device is not contained in any profiles that are accessible to the requester device, the method moves to block 318, and the server transmits a denial of the request for user data to the requester device. In a particular embodiment, the method proceeds to decision step 320, and it is determined whether a user has issued a request for a temporary credential that the requester device can use to gain access to the requested data. If no request has been issued by the user, the method ends at state 354. On the other hand, if a request for a temporary credential is received, the method continues to decision step 322.

At decision step 322, the server determines whether to issue a temporary credential to the user according to rules included in a credential issuance module within the server computer program. If the credential issuance rules disallow issuing a temporary credential based on the requester device, the data requested and the transaction value, the method can end at state 354. Conversely, if the credential issuance rules determine that a temporary credential may be issued, the method proceeds to block 324, and the temporary credential is generated. In one embodiment, the temporary credential can be generated from credential issuance rules set by the user. In another embodiment, the temporary credential can be generated randomly. In a particular embodiment, an expiration period after which the temporary credential will no longer be valid is set, e.g., according to rules in the credential issuance module.

Moving to block 326, the temporary credential is transmitted to the user according to the credential issuance rules, and the expiration period for the temporary credential is started at the server. The temporary credential can be communicated to the user via a device other than the requester device, such as a user cell phone, computer, or other device. The user can communicate the temporary credential to the requester, and the temporary credential can be transmitted for the temporary credential via the requester device. Continuing to decision step 328, the server determines whether the temporary credential has been received. If the temporary credential is not received within the expiration period, the method moves to block 330, and the server transmits a denial of the request for user data to the requester device. In contrast, when the server receives the temporary credential within the expiration period, the method continues to block 332.

In an alternate embodiment, the temporary credential can be associated with the user and issued to the requester. In this embodiment, the requester can use the short-term credential within the expiration period to access user data, according to the data disbursement rules and credential issuance rules.

At block 332, the server retrieves one or more profiles that the requesting device may access after submitting the credential(s) selected at block 312. In one embodiment, the profile(s) can be retrieved from a user profile store or distributed data store using an information broker module in a computer program embedded within the server memory.

In a particular embodiment, the method proceeds to block 334, and the server determines whether the profile(s) that are retrieved contain any data pointers. If the profile(s) do not contain data pointers, the method moves to decision step 338. If the profile(s) contain data pointers, the method continues to block 336, and data that is referenced by the pointers is retrieved, for example, by the information broker from the distributed data store. The method then moves to decision step 338.

At decision step 338, the server determines whether to suspend transmission of the user profile(s) to the requester device. The server may determine to suspend transmission according to data disbursement rules within the rules engine. Transmission can be suspended due to, for example, a re-established connection with the requester device, a change in the Internet connection of the requester device from hard-wired to wireless, or any other change in the requester device that may compromise security of the user data requested.

In a particular embodiment, if the transmission of user data is suspended, the method moves to block 340, and the server transmits the profile(s) to an intermediate data store. Further, the method continues to block 342, and the server prompts the requester device for an additional credential(s), based on the data disbursement rules. Proceeding to block 344, the server can determine whether it has received the additional credential(s). If the server does not receive the additional credential(s), the method moves to block 346, and the server transmits a denial of the request for user data to the requester device. If the server receives the additional credential(s), the method moves to decision step 348 and the method continues as described.

Returning to decision step 338, if the server does not suspend transmission of user data to the requester device, the method proceeds to decision step 348, and the server determines whether the user profile(s) are to be translated to a security protocol other than the protocol used at the server. If no translation is to be performed, the method continues to block 352. If translation is to be performed, the method moves to block 350, and the server translates the user profile(s) to the security protocol of the requester device, e.g., via a communications broker module in the server's computer program. The method then continues to block 352, and the server transmits the user profile(s) to the requester device with a validation of the credential(s) submitted by the requester device to the server. The method terminates at state 354.

Figure 4:
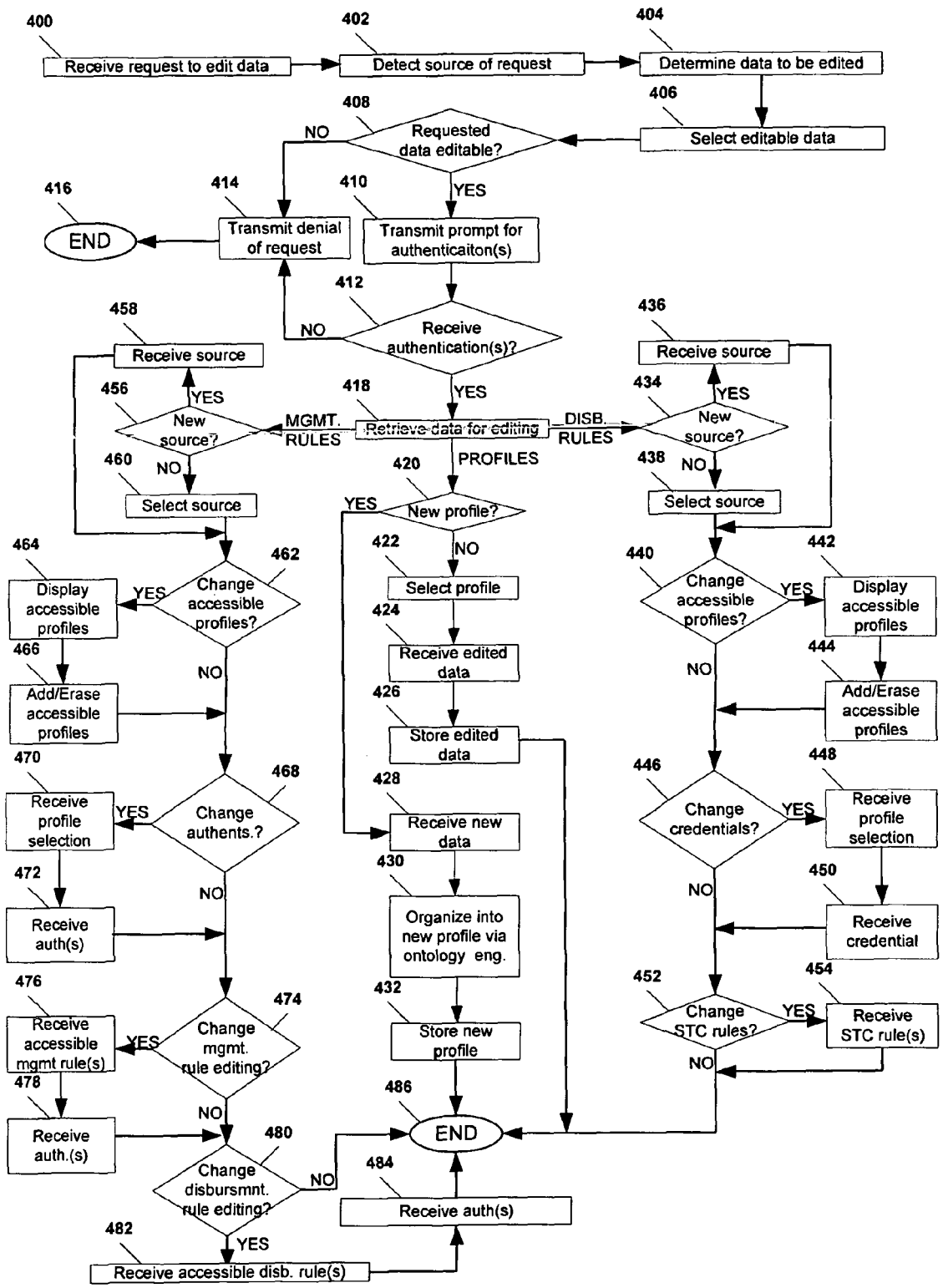
FIG. 4 is a flow diagram illustrating an embodiment of a method of receiving personal data.

Referring to FIG. 4, a method of receiving personal data is illustrated. At block 400, a server including a personal data repository receives a request from a communication device to input or edit personal data associated with a user. Moving to decision step 402, the source of the request is detected. The provider device can be detected and identified, for example, by identifying an IP address of the provider device or by querying a user profile store or distributed data store for a device associated with the user's account.

Continuing to block 404, the server determines the type of data to be edited. In a particular embodiment, the type of data to be edited can be transmitted with the request from the provider device. Alternatively, the server can determine which data is to be edited by communicating a prompt to the provider device for the specific data or type of data that is to be edited. In a particular embodiment, the server can determine a hierarchical level associated with the data to be edited within a user profile store or distributed data store.

After the data to be edited is determined at block 404, the method continues to block 406, and the server selects data that the provider device can access and edit. The server can select the data via a rules engine containing a plurality of user-specified data management rules that determine which user data is accessible to a provider device, based at least partially on the identity of the provider device.

Proceeding to decision step 408, the server determines whether the data to be edited is available to the provider device. For example, the provider device may transmit a request to edit the user's drivers license number, but the data management rules in the rules engine may determine that the provider device does not qualify to gain access to the user's drivers license number. In another example, the provider device may transmit a request to edit one or more data disbursement rules, but the data management rules may deny the provider device access to the data disbursement rules. If the data to be edited by the provider device is not accessible to the provider device according to the data management rules, the method proceeds to block 414, and a denial of the request to edit user data is transmitted to the provider device. The denial can be generated and transmitted to the provider device by a security layer or communications broker within a computer program embedded in the server's memory device. The method then terminates at state 416.

Returning to decision step 408, if the server determines that the user data to be edited is accessible to the provider device according to the data management rules, the method proceeds to block 410, the server prompts the provider device for one or more types of authentication. The server can issue the prompt, for example, from a security layer in a computer program embedded within the server's memory. The server selects one or more types of authentication that are used to authenticate the provider device, before allowing access to the user data that is to be edited. In a particular embodiment, the authentication(s) used can be selected according to data management rules in a rules engine of a computer program embedded within the server.

Moving to decision step 412, the server can determine whether the authentication(s) used have been received from the provider device. If the authentication(s) are not received, the method moves to block 414, and the server can transmit a denial of the request for user data to the provider device. The method can end at state 416.

When the authentication(s) are received at decision step 412, the method proceeds to block 418, and the server retrieves data that the provider device may access after submitting the authentication(s). In one embodiment, the data can be retrieved from a user profile store, the distributed data store, or any combination thereof.

In a particular embodiment, the data retrieved for editing can include, for example, data management rules, data disbursement rules, or user profiles. If the data to be edited includes user profiles, the method continues to decision step 420, and it is determined whether a selection to create a new profile has been received at the server. If the user does not wish to create a new profile, the method proceeds to block 424, and edited data associated with an existing user profile is received. Further, the edited data can be stored at block 426.

Returning to decision step 420, if the server determines that it has received a selection to create a new profile, the method moves to block 428, and the server receives new data from the user via the provider device. In a particular embodiment, the method continues to block 430, and the data can be organized into one or more new profiles by an ontology engine within the server's computer program. The new profile(s) can be stored at block 432. The method can terminate at state 486.

Returning to block 418, if the data retrieved for editing includes data disbursement rules, the method moves to decision step 434, and it is determined whether the server receives a request to enter rules for a new communication source. If the server determines that rules are to be created for a new communication source, the method proceeds to block 436, and an identification of the new source is received. The identification can include a name of the source, such as a merchant or employer name, an IP address of the communication source, or any other information suitable for identifying the communication source. After the identification of the communication source is received, the method moves to decision step 440 and continues as described.

If it is determined at decision step 434 that the user wishes to edit rules for an existing communication source, the method moves to block 438, and a selection of a communication source for which rules have already been established is received. The method then proceeds to decision step 440, and the server determines whether the user wishes to change or specify the profile(s) that the identified communication source can access. If a selection not to change accessible profiles is received, the method moves to decision step 446. On the other hand, if a selection to change the accessible profile(s) is received, the method continues to block 442, and the profile(s) that are currently accessible to the communication source are transmitted to the provider device for display. Further, at block 444, one or more profiles can be added to, or deleted from, the accessible profiles is received. The method then proceeds to decision step 446.

At decision step 446, the server determines whether it has received a selection to change credentials that are to be used to verify the identified communication source before it may access one or more profiles. If a selection not to change credentials is received, the method continues to decision step 452. Conversely, if a selection to change credentials is received at the server from the provider device, the method moves to block 448, and a selection of a user profile that is accessible to the communication source is received. Additionally, at block 450, one or more credentials used to verify the identified communication source is received. The method then proceeds to decision step 452.

In a particular embodiment, at decision step 452, the server determines whether it has received a selection to edit any temporary credential (temporary credential) rules. If the server receives a selection not to change temporary credential rules, the method continues to decision step 456. On the other hand, if the server receives a selection to change temporary credential rules, the method proceeds to block 458, and one or more rules for issuing a temporary credential are received. Temporary credential rules can include specific temporary credentials, one or more methods for generating a temporary credential, one or more rules for assigning an expiration period to a temporary credential, and other rules necessary for generating, issuing and receiving temporary credentials. The method can terminate at state 486.

Returning to block 418, if the data retrieved for editing includes data management rules, the method moves to decision step 456, and the server determines whether a selection has been received to enter data management rules for a new communication source. If a selection to enter a new source is received, the method proceeds to block 458, and an identification of the new communication source is received. The identification of the communication source can include a name of the communication source, such as 'home PC' or 'my laptop.' The identification can also include an IP address and any other information suitable for identifying the communication source. The method then continues to decision step 462 and continues as described.

Returning to decision step 456, if a selection to edit data management rules for an existing communication source is received, the method moves to block 460, and a selection of a source for which data management rules have already been established is received. The method then continues to decision step 462, and it is determined whether a selection to change or specify which profile(s) are accessible to the communication source is received from the provider device. If a selection not to change accessible profiles is received, the method continues to decision step 468. On the other hand, if a selection to change accessible profiles is received, the method moves to block 464, and the profile(s) currently accessible to the identified communication source are transmitted to the provider device for display. Further, the method can proceed to block 466, and one or more profiles can be added to, or deleted from, the profiles that are accessible to the communication device. The method then continues to decision step 468.

At decision step 468, it is determined whether the server has received a selection to change types of authentications used to authenticate the identified communication source before it may access one or more profiles. If a selection not to change authentications is received, the method continues to decision step 474. Conversely, if a selection to change authentications is received at the server from the provider device, the method moves to block 470, and a selection of a user profile that is accessible to the communication source is received at the server. Additionally, at block 472, one or more authentications used to verify the communication source is received. The method then proceeds to decision step 474.

Continuing to decision step 474, the server determines whether it has received a selection to change management rule editing rules is received at the server. If a selection not to change management rule editing is received, the method continues to decision step 480. Conversely, if a selection to change management rule editing is received at the server from the provider device, the method moves to block 476, and a selection of management rules that are accessible to the communication source are received from the provider device. Further, at block 478, authentications used for the communication source to access the accessible data management rules are received. The method then continues to decision step 480.

Moving to decision step 480, it is determined whether the server has received a selection to change disbursement rule editing rules is received at the server. If a selection not to change disbursement rule editing is received, the method terminates at state 486. Conversely, if a selection to change disbursement rule editing is received at the server from the provider device, the method moves to block 482, and a selection of disbursement rules that are accessible to the communication source are received from the provider device. Further, at block 484, authentications used for the communication source to access the accessible data disbursement rules are received. The method terminates at state 486.

Figure 5:
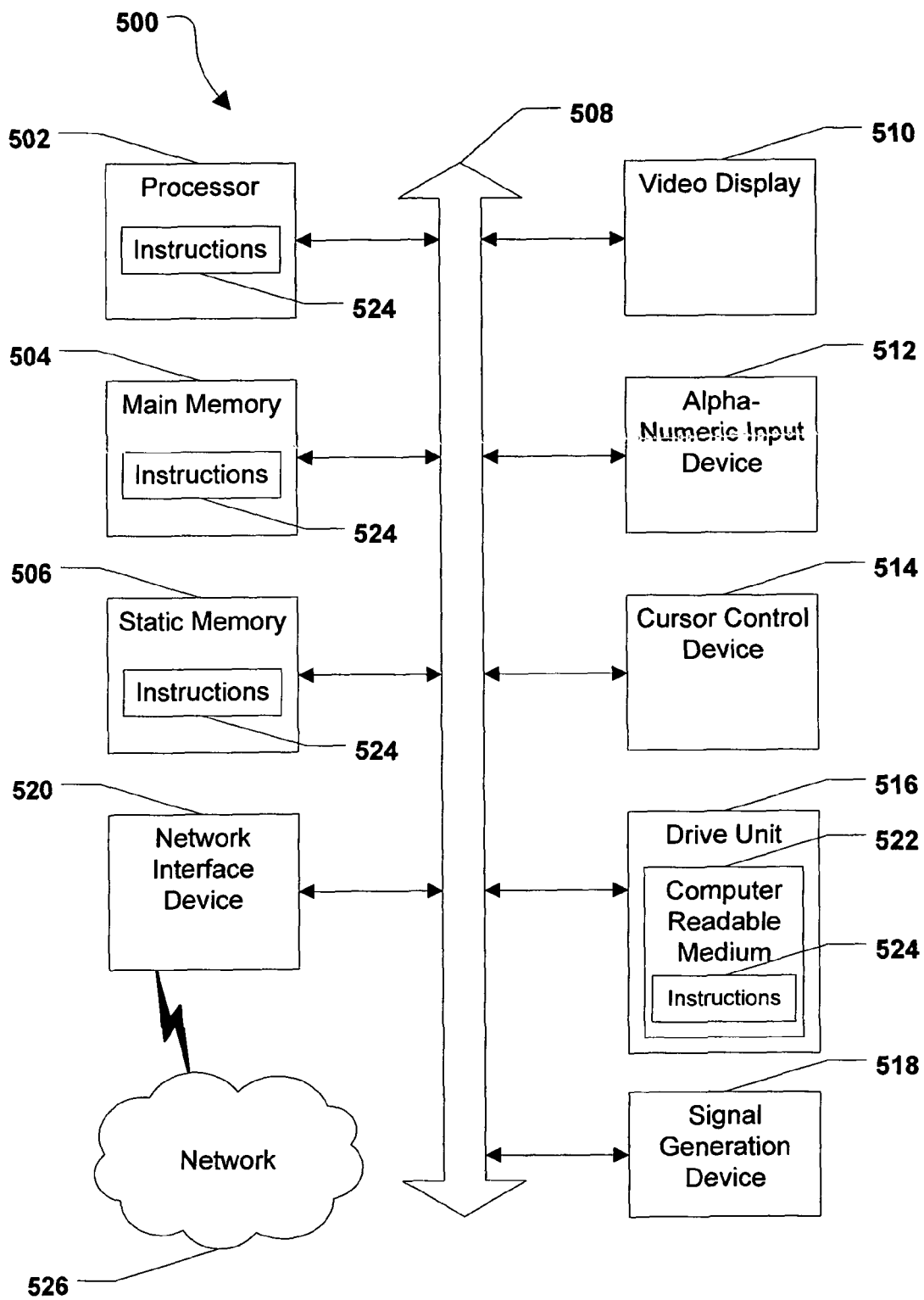
FIG. 5 is a diagram of an embodiment of a general computer system.

Referring to FIG. 5, an illustrative embodiment of a general computer system is illustrated and is designated 500. The computer system 500 can include a set of instructions that can be executed to cause the computer system 500 to perform any one or more of the methods or computer based functions disclosed herein. The computer system 500, or any portion thereof, may operate as a standalone device or may be connected, e.g., using a network, to other computer systems or peripheral devices, or may be embedded within a server that includes a personal data repository, such as that described with reference to FIG. 1.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. Moreover, the computer system 500 can include a main memory 504 and a static memory 506 that can communicate with each other via a bus 508. As illustrated, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is illustrated to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In conjunction with the configuration of structure described herein, the system and method disclosed provide an identity or profile clearinghouse that consolidates user' identity profiles used for e-commerce and personalization, among other functions. The clearinghouse contains multiple profiles that can represent accounts in various applications and diverse contexts of access (e.g., public computers versus registered home computers). The clearinghouse also supports the use of transaction history and rankings if authorized by users, for example, via an auditing module. The clearinghouse supports rules and constraints that regulate the release of confidential information under specified circumstances and the issue of temporary credentials when the risk of compromise is significant. The disclosed system and method can be implemented using a wide range of devices, from PCs to magnetic credit cards to cell phones, and a wide variety of applications, from e-commerce to electronic subscriptions and individual data or Internet portals. Although the system and method have been described with reference to a single clearinghouse, multiple linked clearinghouses can be used without departing from the scope of the disclosure.

In an illustrative, non-limiting embodiment, the system disclosed herein can include a clearinghouse for authentication and personalization that is positioned as an intermediary between requestors and providers, such as customers and merchants. The clearinghouse can include full customer or merchant profiles, including authentication information, or can be linked with other distributed and trusted repositories of such information. The clearinghouse can be a trusted intermediary, as it can be operated independently of the providers and requestors and can store and manage their profiles without being compromised by an affiliation. The clearinghouse can also serve as a guarantor of the validity of information, such as ratings, rules, and context information, which is presented to the parties in a transaction.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments illustrated. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of using personal data, the method comprising:
    storing, via a computer system, a plurality of profiles of a user, wherein each profile includes user data;
    receiving, at the computer system, a request for particular user data contained in at least one of the profiles via a first communication device, wherein the particular user data is associated with the user;
    determining, at the computer system, that the particular user data cannot be sent to the first communication device based at least in part on the first communication device and at least one disbursement rule;
    determining, at the computer system, whether a request for a temporary credential for the first communication device was received at the computer system via a second communication device, wherein the second communication device is associated with the user;
    sending, from the computer system to the first communication device, a denial of the request for the particular user data when the request for the temporary credential was not received; and
    sending, from the computer system to the second communication device, a temporary credential when the request for the temporary credential for the first communication device was received.

2. The method of claim 1, further comprising:
    receiving the temporary credential from the first communication device;
    validating the temporary credential; and
    sending the particular user data to the first communication device from the computer system.

3. The method of claim 2, further comprising translating the particular user data from a first data security protocol to a second data security protocol via a communication broker.

4. The method of claim 1, wherein a first profile of the plurality of profiles comprises a default profile including at least a name and a phone number of the user, and wherein a second profile of the plurality of profiles comprises a banking profile including at least a checking account number.

5. The method of claim 1, wherein a first profile of the plurality of profiles comprises a default profile including at least a name and a phone number of the user, and wherein a second profile of the plurality of profiles comprises a shopping profile including purchasing preferences of the user.

6. The method of claim 1, wherein determining that the particular user data cannot be sent to the first communication device is based in part on the particular user data requested.

7. The method of claim 1, wherein the first communication device comprises a communication source selected from a group consisting of: a telephony device, a computing device, an electronic authentication device, a smart card reader, a universal identification card reader, and a biometric authentication device.

8. The method of claim 1, further comprising detecting the communication source.

9. The method of claim 1, wherein sending the denial from the computer system to the first communication device comprises transmitting the denial via a communications broker.

10. The method of claim 1, wherein the temporary credential further comprises at least one credential chosen from a group consisting of a user name, a password, a key, a smart card code, a universal identification card code, a voice print, a fingerprint, a retinal scan, and a deoxyribonucleic acid (DNA) analysis.

11. The method of claim 1, wherein the user data comprises data received from the user.

12. The method of claim 1, further comprising:
    retrieving the user data from at least one distributed data store via an information broker, wherein at least one data pointer refers to the user data within the at least one distributed data store; and
    wherein the user profile further comprises the at least one data pointer.

13. The method of claim 1, further comprising:
    selecting an additional credential at least partially based on: the origin of the request, the user data requested, the transaction value, the plurality of data disbursement rules, or any combination thereof; and transmitting a prompt to the user for the additional credential.

14. The method of claim 13, further comprising suspending retrieval of a selected user profile until the additional credential is received from the user and validated.

15. The method of claim 13, further comprising suspending transmission of a selected user profile until the additional credential is received from the first communication device and validated.

16. The method of claim 15, further comprising maintaining the selected user profile at an intermediate data store until the additional credential is received from the first communication device and validated.

17. The method of claim 1, further comprising:
establishing an expiration period to receive the temporary credential; and
denying the request for the particular user data when the temporary credential is not received within the expiration period.

18. A method of receiving personal data, the method comprising:
storing, via a computer system, a plurality of profiles of a user, wherein each profile includes user data;
receiving, at the computer system from a communication device, a first request to provide at least a portion of the user data;
determining, at the computer system, an identification of the communication device, wherein the identification of the communication device comprises a device type of the communication device and an association of the communication device to the user;
selecting, at the computer system, a first authentication at least partially based on the device type, the association of the communication device to the user, and a plurality of data management rules; and
sending a prompt for the first authentication to the communication device from the computer system.

19. The method of claim 18, further comprising selecting at least one of the plurality of profiles at least partially based on the identification of the communication device and the plurality of data management rules.

20. The method of claim 18, further comprising:
receiving a second request from a provider to edit at least a portion of the user data for a first user;
determining particular user data to be edited;
selecting a second authentication based at least in part on the provider and the plurality of data management rules;
sending a prompt for the second authentication to the provider;
receiving a response from the provider; and
validating the response.

21. The method of claim 20, further comprising:
determining whether the particular user data is editable based on the plurality of data management rules and a source of the second request; and
denying the second request when the particular user data is not editable.

22. The method of claim 21, further comprising allowing the provider to access and edit the particular user data after validating the response.

23. The method of claim 22, further comprising receiving data from the provider.

24. The method of claim 23, further comprising organizing the data into the plurality of user profiles for the first user.

25. The method of claim 24, wherein the plurality of data management rules comprise a plurality of ontology rules that specify an arrangement of user data in each of the plurality of user profiles of the first user.

26. The method of claim 22, further comprising receiving a particular data management rule from the provider that specifies:
an identification of a communication source;
a type of authentication used to access and edit user data via the communication source; and
which user data may be accessed and edited via the communication source after validation of an authentication response.

27. The method of claim 26, wherein the particular data management rule specifies which of the plurality of data management rules may be accessed and edited via the communication source after the validation of the authentication response.

28. The method of claim 27, wherein the particular data management rule specifies which of a plurality of data disbursement rules may be accessed and edited via the communication source after the validation of the authentication response.

29. The method of claim 22, further comprising receiving a data disbursement rule from the provider that specifies:
an identification of a communication source;
a type of credential used to receive user data via the communication source; and
which user data may be received at the communication source after the type of credential is received.

30. The method of claim 29, wherein the data disbursement rule specifies:
a temporary credential used to receive user data at the communication source; and
which user data may be used at the communication source after the temporary credential is received.

31. The method of claim 30, wherein the data disbursement rule specifies an expiration period of the temporary credential.

32. The method of claim 18, wherein the communication device comprises a communication source chosen from a group consisting of: a telephony device, a personal computing device, a laptop computing device, an electronic authentication device, a smart card reader, a universal identification card reader, and a biometric authentication device.

33. The method of claim 18, wherein the first authentication comprises at least one authentication chosen from a group consisting of: a user name, a password, a key, a smart card code, a universal identification card code, a voice print, a fingerprint, a retinal scan, and a deoxyribonucleic acid (DNA) analysis.

34. A system, comprising:
a computer system to retrieve a plurality of profiles of a user from a data repository, wherein each profile includes user data, and wherein the computer system includes:
a communication broker module to receive a request for a portion of the user data; and
a rules engine to select at least one type of credential to be required from a source of the request before the computer system allows the portion of the user data to be sent to the source, wherein the at least one type of credential required includes a first credential when the source is associated with the user and a second credential when the source is not associated with the user.

35. The system of claim 34, wherein the first credential comprises a user identification and password.

36. The system of claim 34, wherein the second credential is a smart card input.

37. A system, comprising:
a computer system to retrieve a plurality of profiles of a user from a data repository, wherein each profile includes user data, and wherein the computer system includes:
 a communication broker module to receive a request from an entity to provide at least a portion of the user data and to detect a source of the request; and
 a rules engine to select at least one type of authentication to be required from a source of the request before the computer system stores data provided from the source in at least one profile of the user, wherein the at least one type of authentication required includes a first authentication when the source is associated with the user and a second authentication when the source is not associated with the user.

38. A computer program embedded in a non-transitory computer-readable storage medium, the computer program comprising:
 instructions to store a plurality of profiles of a user, wherein each profile includes user data;
 instructions to receive a request for particular user data from a first communication device;
 instructions to determine whether the particular user data can be sent to the first communication device;
 instructions to transmit a denial of request when the particular user data cannot be sent to the first communication device;
 instructions to determine whether a request for a temporary credential for the first communication device is received after the denial of request is transmitted; and
 instructions to send to the first communication device a prompt for the temporary credential when a request for the temporary credential for the first communication device was received via a second communication device associated with the user.

39. A computer program embedded in a non-transitory computer-readable storage medium, the computer program comprising:
 instructions to store a plurality of profiles of a user, wherein each profile includes user data;
 instructions to receive a request to provide at least a portion of the user data from a communication device;
 instructions to determine an identification of the communication device wherein the identification of the communication device comprises a device type of the communication device and an association of the communication device to the user;
 instructions to select a type of authentication at least partially based on the device type, the association of the communication device to the user, and a plurality of data management rules; and
 instructions to send to the communication device a prompt for the selected type of authentication.

\* \* \* \* \*